March 25, 1952  E. C. HARTLEY  2,590,312
DIFFERENTIAL FUEL REGULATOR FOR TURBOJET ENGINES
Filed Jan. 31, 1947  2 SHEETS—SHEET 1

Inventor
EMMETT C. HARTLEY
By Mason, Parker, Miller & Stewart
Attorneys

March 25, 1952  E. C. HARTLEY  2,590,312
DIFFERENTIAL FUEL REGULATOR FOR TURBOJET ENGINES
Filed Jan. 31, 1947  2 SHEETS—SHEET 2

Inventor
EMMETT C. HARTLEY

Patented Mar. 25, 1952

2,590,312

UNITED STATES PATENT OFFICE 2,590,312

DIFFERENTIAL FUEL REGULATOR FOR TURBOJET ENGINES

Emmett C. Hartley, Euclid, Ohio, assignor to The Parker Appliance Company, Cleveland, Ohio, a corporation of Ohio Application January 31, 1947, Serial No. 725,491

2 Claims. (Cl. 264—9)

The following specification relates in detail to improvements in differential fuel regulators for turbojet engines, adapted primarily for use in aviation but suitable wherever a fluid fuel supply is required to be adjusted or controlled in accordance with needs or change in operating conditions.

In the development of airplanes propelled by jet engines, flying speed is proportional to the volume of the jet without regard to changes in altitude or rarefaction of the air. The force of the jet, in turn, is dependent upon the volume of supercharged air. As altitude is reached and a rarer atmosphere encountered, the force of the jet increases and, consequently, the supercharging resulting from the movement of the turbine is accelerated.

Some means must be devised for compensating for this change in engine (turbine) speed. In the absence of some mechanical compensator, the operator of the airplane must manipulate the fuel throttle manually in order to maintain a constant flying speed. This is a definite handicap in the operation of planes of this type.

One of the objects of my invention is to adjust the feeding of the fuel by automatic means independent of attention by the operator.

A further object of my invention is to maintain a constant speed of rotation for the turbine and thus indirectly of the supercharger by varying the feed of fuel with change in elevation.

A still further object of my invention is to provide means for automatically reducing the volume of fuel by cutting down the throttle whenever the jet becomes too great and raises the temperature to a degree dangerous for the engine parts.

Another object of my invention is to provide means subject to the control of the operator to permit full manual operation of the throttle valve regardless of the mechanical means provided.

As illustrating a typical example of my invention, I have shown the preferred form in the accompanying drawings in which:

Fig. 1 is a side elevation of the regulating means and wiring diagram of controls for a differential regulator for the fuel supply of a turbojet engine and the like;

Generally speaking, the invention consists of a differentially operating throttling means controlled by the speed of the supercharged turbine in relation to predetermined motor operating means under the direct control of the operator.

Thus I have shown a gear casing 6 with which is associated a valve housing 7 and a variable speed direct current electric motor 8.

These instrumentalities are assembled together for joint operation.

Figure 1:
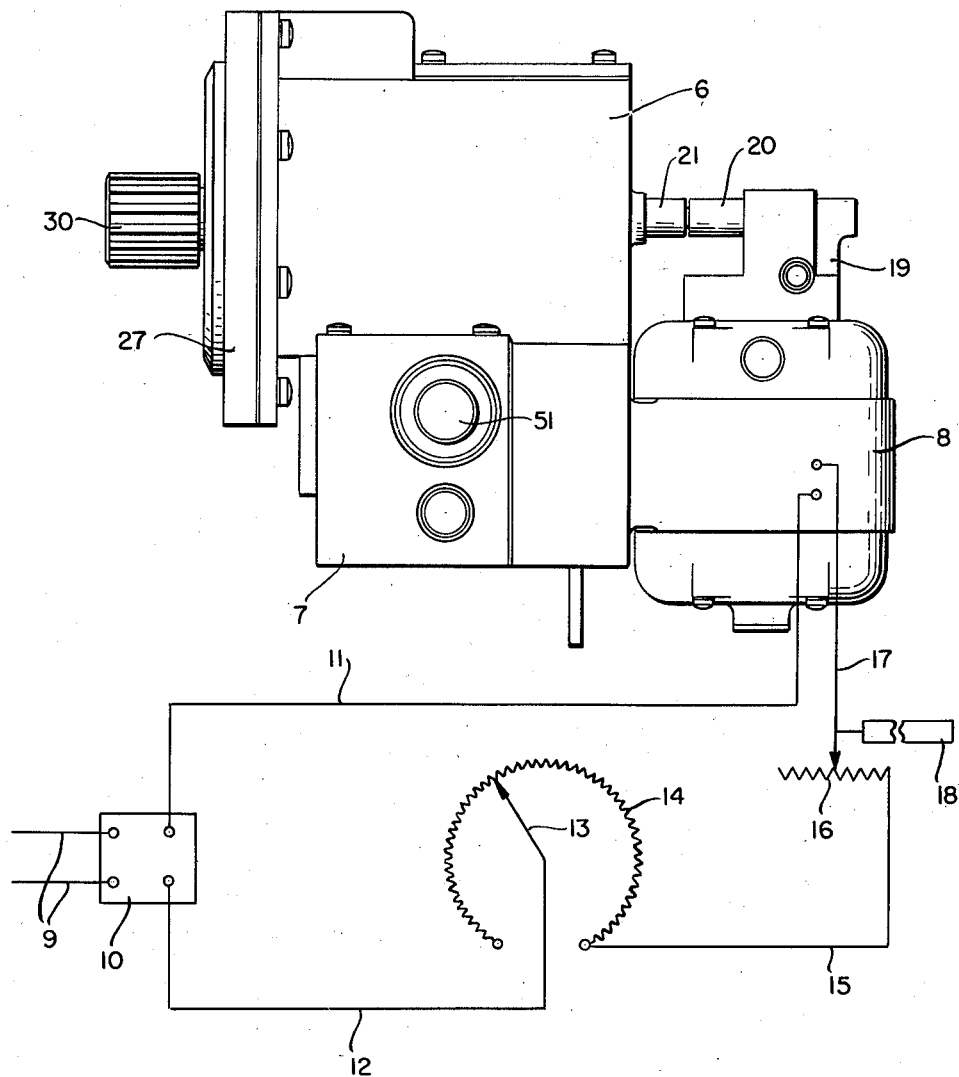

As shown in Fig. 1 the electric motor is operated by direct current from leads 9 connected to the conventional electric circuit of the plane. Direct current from the leads 9 is supplied through a voltage regulator 10. This is set sufficiently below the prevailing voltage of the circuit 9 that it will be reasonably free from variation or fluctuation.

One lead 11 is connected directly to the operating circuit of the motor 8. The opposite lead 12 is connected to a rotating contact arm 13. This arm is in engagement with a rheostat winding 14 so that variable resistance may be placed in the electric circuit thus altering the motor speed as desired. Conductor 15 leads from the winding 14 to a resistance element 16. A contact member 17 movable along the resistance 16 is connected, in turn, to the operating circuit of the motor 8.

Adjustment of the arm 13 is directly under the control of the operator so that the variable speed of the motor 8 may be adjusted and thus serve as an indirect means of controlling the opening of the throttle valve.

As a protective measure and to prevent full speed operation when the heat of the jet becomes excessive and more than the engine parts can withstand, a thermostat element 18 is provided. This element is within the influence of the jet. It is operatively connected to the arm 17 and serves on excessive operating temperatures to introduce more resistance from the winding 16 so that the speed of the motor 8 is decreased.

Figure 3:
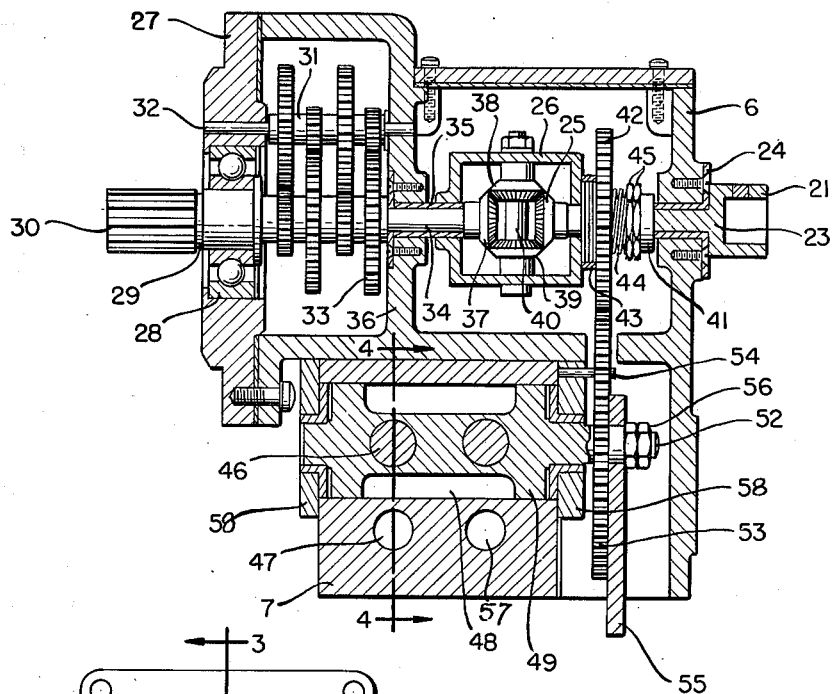
Fig. 3 is a vertical cross-section of the same on the line 3—3 of Fig. 2.
Figure 2:
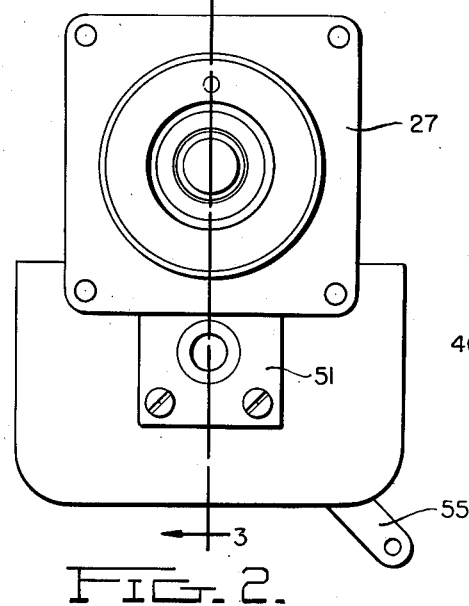
Fig. 2 is an end view of the fuel regulator with the motor removed.

The shaft of the motor 8 operates upon a speed reducer 19 to drive shaft 20 at a reduced rate of speed. Shaft 20 is connected to a coupling 21 forming part of a shaft 22 journaled in sleeve bearing 24 on the gear casing 6. The shaft 23 projects inwardly of the casing 6 and terminates in a beveled drive gear 25 which forms part of the differential structure 26 (Fig. 3).

The opposite end of the gear casing 6 has an end plate 27 with a central ball bearing 28. A shaft 29 is journaled in the bearing 28 and on its outer projecting end carries a pinion 30. This pinion is operatively connected to a power take-off driven by the turbine of the engine.

A train 31 of reducing gears is carried upon the inner end of shaft 29 and countershaft 32. The low speed gear 33 is fixed on a shaft 34 which is journaled in a sleeve bearing 35 passing transversely through the partition 36 of the gear casing. The inner end of shaft 34 has a beveled drive gear 37 opposite drive gear 25.

Sleeve bearings 24 and 35 form journals for the differential cage 26. Idle gears 38, 39 are mounted loosely on transverse shaft 40 in the cage 26. This forms the well-known type of differential gearing by which cage 26 is controlled in its movements either in one or the other direction or held stationary by appropriate rotation of the shafts 23 and 29.

One side of the cage 26 is extended to form a sleeve 41 loosely journaled on the sleeve bearing 24. Sleeve 41, in turn, carries, loosely, a ring gear 42. Gear 42 is separated from the cage 26 by means of a friction clutch 43. A tension spring 44 and lock nuts 45 maintain suitable frictional engagement between the ring gear 42 and the cage 26 so that the ring gear will normally follow the cage in its rotation.

Figure 4:
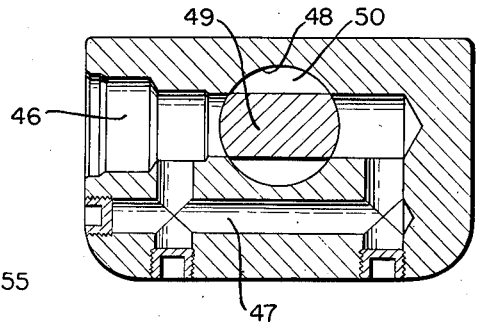
Fig. 4 is an enlarged vertical cross-section of the fuel valve taken on the line 4—4 of Fig. 3.

Beneath the gear casing 6 there is mounted the valve housing 7. This housing has an inlet port 46 on one side. This port has a lower branch passageway 47 by which the fluid fuel is brought around to approach the valve opening 48 from opposite sides (see Fig. 4). In this manner fuel is delivered in a relatively large volume and at high pressure on opposite sides of the valve.

The valve chamber 48 is generally cylindrical and contains a bobbin 49 which is closed at the ends but has intermediate chordal openings 50.

The valve outlet 51 is connected to the valve chamber 48 on the opposite side from the inlet 46. It is also provided with by-passes so that it opens on opposite sides of the bobbin 49 in the same manner in which the inlet port is arranged.

By the above arrangement fluid fuel under high pressure is introduced through inlet 46 to opposite sides of the bobbin valve 49. When the valve is opened by partial rotation of the bobbin, fuel enters both chordal openings 50 and passes longitudinally of the valve to the discharge ports provided. In this way the fuel leaves the valve on the same side in which it enters and the pressures on opposite sides of the valve are balanced.

The bobbin 49 is journaled in end plates 58, 58. One end of the bobbin is extended to form the shaft 52 in a chamber 53 at one end of the valve housing (see Fig. 3). This shaft 52 has keyed to it a ring gear 53 in mesh with ring gear 42. A stop pin 54 mounted on end wall 51 is carried in an arcuate slot in ring gear 53 permitting limited partial rotation of the ring gear 53 and consequent opening and closing of the valve itself.

A lever 55 also keyed to shaft 52 is adapted to be operated manually whenever it is desired to open or close the valve independently of the action of the differential regulator. The ring gear 53 and lever 55 are held on the shaft 52 by means of lock nut 56.

Operation of the regulating means will be apparent. The desired motive power is under control of the operator through his manual adjustment of the rheostat 14. This first determines the speed of the motor 8 and the driving gear 25.

Operation of the jet motor rotates the turbine and indirectly the pinion 30 and driving gear 37.

Relative rotation of the differential gear between the gears 25 and 37 will cause ring gears 42 and 53 to operate the fuel feeding valve 49.

In practice the rarefaction of the atmosphere at higher elevations will increase the turbine speed and thus partially throttle the fuel valve. This maintains the motor shaft speed constant. The converse effect takes place when the plane comes down to lower and denser atmospheres. There the decrease in speed of the turbine due to heavier load of the supercharger produces relative rotation of the differential gear and partial opening of the fuel valve. This fuel valve is under emergency control from the auxiliary lever 55.

The lever overcomes the friction of the clutch and permits independent adjustment of the fuel valve.

In the event that the jet heat becomes excessive thermostat 18 will impose added resistance 16 in the motor circuit and thus reduce the speed of gear 25. Relative rotation of the differential gear will have the same effect as increase speed of the turbine pinion 30 and thus the fuel valve will be partially throttled.

While the principles of my invention have been disclosed above in their preferred embodiment, it is to be understood that the regulator may be designed with considerable latitude as to proportions, materials and arrangement without departing from the scope of the invention as defined in the following claims.

What I claim is:

1. In combination, means for regulating the fuel fed to an internal combustion engine comprising, a fuel valve, a valve adjusting means, a differential gear for actuating the valve adjusting means, gearing responsive to the engine speed acting on the differential gear, and a motor acting on said differential gear, a manually operated speed control for the motor and a thermostatic speed control for the motor, responsive to engine temperatures, both said controls being connected in series.

2. In combination, speed regulating means for an internal combustion engine, a differential gear for actuating said regulating means, engine-speed responsive means acting on the differential gear, a motor acting independently upon the differential gear, a manually operated control means for the motor and thermostatic means responsive to the operation of the engine for independently controlling the speed regulating means said control and thermostatic means being connected in series.

EMMETT C. HARTLEY.

REFERENCES CITED

The following references are of record in the file of this patent:

UNITED STATES PATENTS

| Number | Name | Date |
|---|---|---|
| 1,749,569 | DeFlorez | Mar. 4, 1930 |
| 2,054,908 | Moore | Sept. 22, 1936 |
| 2,252,545 | Benz | Aug. 12, 1941 |
| 2,339,989 | Glanville | Jan. 25, 1944 |
| 2,403,371 | Ifield | July 2, 1946 |

FOREIGN PATENTS

| Number | Country | Date |
|---|---|---|
| 2,851 | Great Britain | Feb. 22, 1890 |